UNITED STATES PATENT OFFICE.

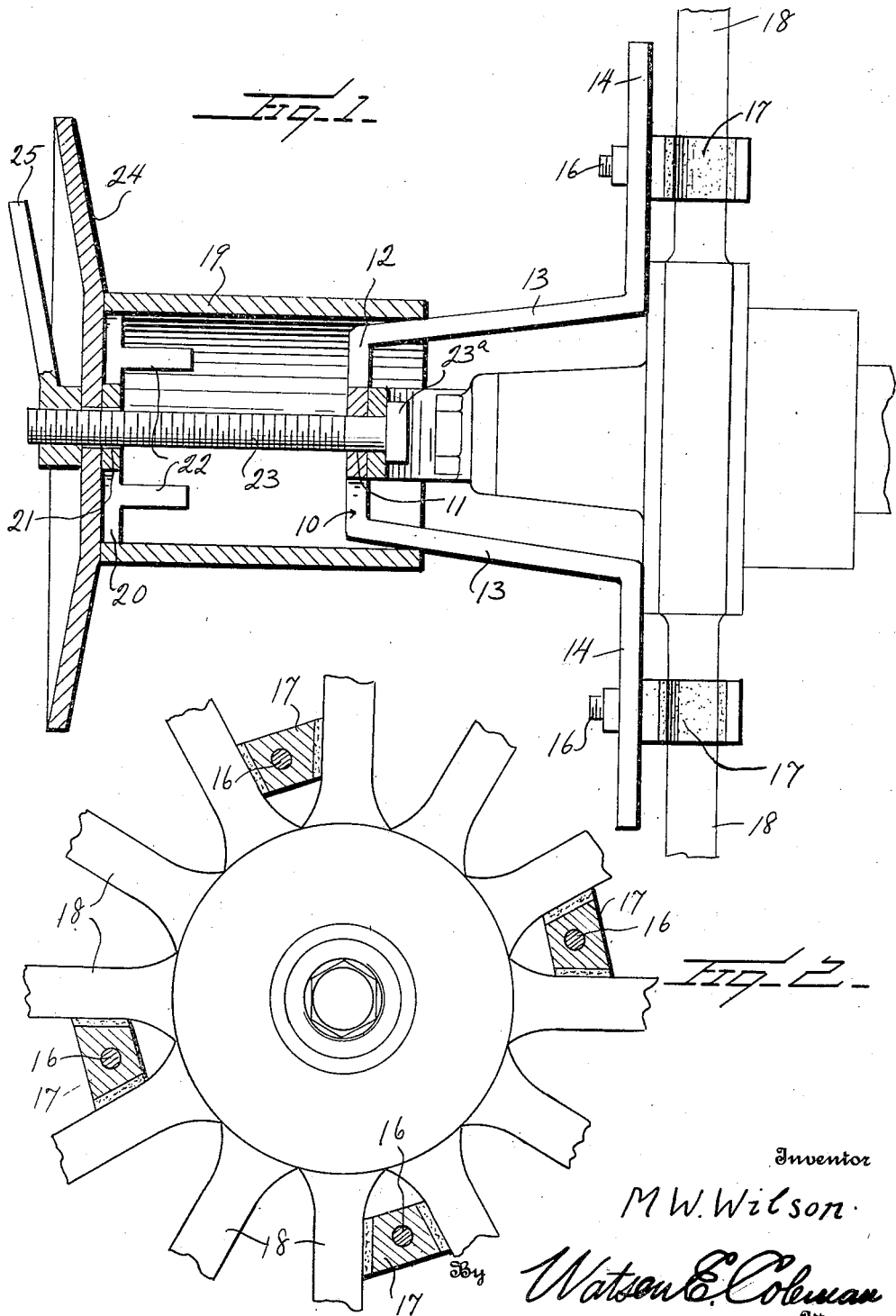

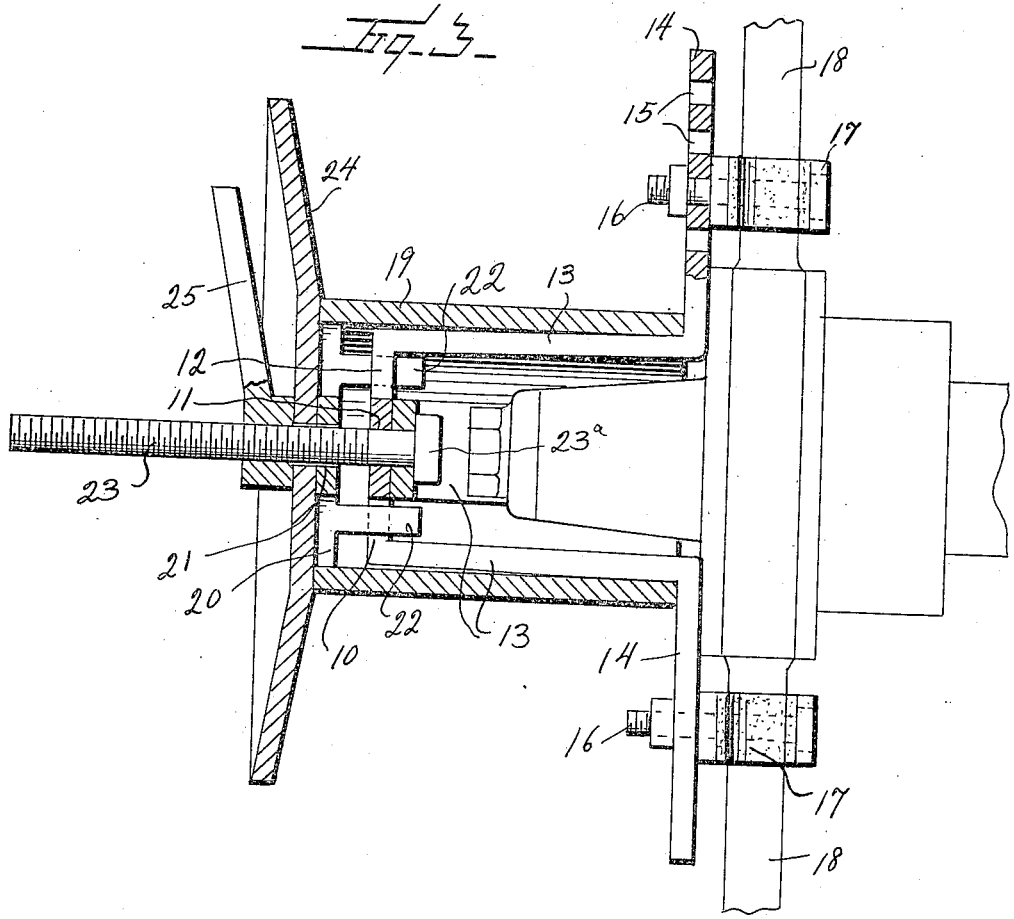
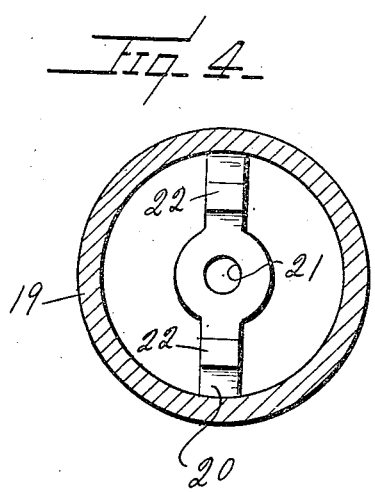
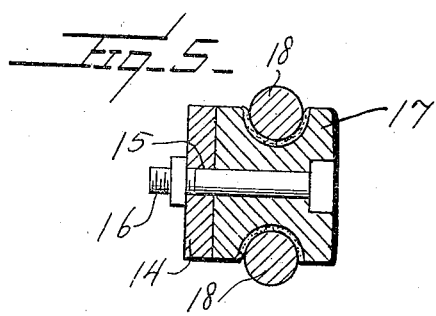

MONROE W. WILSON, OF TEMPLE, OKLAHOMA.

DETACHABLE CABLE-DRUM FOR SPOKED WHEELS.

1,381,152.  Specification of Letters Patent.  Patented June 14, 1921.

Application filed August 7, 1920. Serial No. 401,942.

*To all whom it may concern:*

Be it known that I, MONROE W. WILSON, a citizen of the United States, residing at Temple, in the county of Cotton and State of Oklahoma, have invented certain new and useful Improvements in Detachable Cable-Drums for Spoked Wheels, of which the following is a specification, reference being had to the accompanying drawings.

This invention relates to improvements in detachable cable drums for use with spoked wheels and more particularly to a cable drum adapted for attachment to the wheel of an automobile or other self propelled vehicle for service in withdrawing the vehicle from mud or converting the vehicle for use as a power engine.

An important object of the invention is to provide a device of this type which is attachable to practically all makes of automobiles with a minimum expenditure of time and labor. To this end the invention consists in a yoke framework embodying spring fingers provided with portions adapted to engage intermediate the spokes of the wheel and interlocking therewith, the fingers being normally expanded and a cuff or drum portion operatively connected with the yoke to shift longitudinally thereof and compress the spring fingers and bring the spoke engaging portions thereof into interlocking engagement with the spokes.

In the accompanying drawings, I have illustrated a preferred form of my invention and in these drawings, in which like reference characters designate like parts throughout, and in which:

Figure 1 is a transverse sectional view of a device constructed in accordance with my invention showing the same as it is initially applied to the wheel.

Fig. 2 is a sectional view showing the manner in which the spoke engaging portion co-acts with the spokes.

Fig. 3 is a sectional view similar to that shown in Fig. 1, the drum being in the fully applied position.

Fig. 4 is a transverse sectional view taken through the cuff portion of my device; and Fig. 5 is a detailed view embodying a transverse sectional view of one of the spoke engaging portions in applied position upon the spokes.

Referring now more particularly to the drawings, the numeral 10 indicates a suitable yoke composed of a pair of relatively shiftable substantially U shaped sections each provided centrally of that portion of the sections forming the base 12 of the U with an aperture 11 for the reception of the bolt 23 about which the sections are shiftable. The arms 13 of the sections are provided at their inner ends with feet outturned 14 disposed in substantially the same vertical plane to which plane the U-shaped sections are mutually perpendicular. These feet 14 are provided with spaced apertures 15 adapted to interchangeably receive bolts 16, which form a retaining means for spoke chucking portions 17. These chucking portions have their sides grooved to receive the spokes and are provided upon the walls of the grooves with some relatively soft material such as leather or the like. These grooves are adapted to receive the sides of the spoke 18 of the wheel, the yoke 10 being disposed about the hub thereof.

The sleeve or cuff 19 is provided having its outer end either completely closed or provided with a transverse rib 20 having a central aperture 21 longitudinally disposed of the sleeve 19. Projecting inwardly from the outer end of the sleeve 19 upon the rib 20 thereof or upon any suitable end closure which may have been employed are stop pins 22 the purpose of which will hereinafter be more fully described. A threaded member or bolt 23 having a headed end 23ᵃ is disposed through the opening of the yoke 10 and has its headed end abutting the inner face thereof, the outer end of the bolt extending through the aperture 21 of the sleeve 19. A flanged disk 24 is provided which is likewise provided with an aperture slidably receiving the bolt 23. This bolt is provided exteriorly of the flanged disk with a lever nut 25.

When it is desired to attach my improved drum to a wheel, the yoke 10 is placed upon the hub thereof, with the spoke engaging portions 17 disposed intermediate the spokes, these spoke engaging portions having been previously adjusted upon the feet 14 to bring them into the proper position. It will be seen in placing the sleeve 19 and the flanged disk 24 in position and by rotating the lever nut 25, the sleeve or cuff 19 is driven inwardly upon the extensions 13 of the yoke 10. These extensions are formed of resilient metal and as clearly shown in the drawings, diverge outwardly giving the yoke 10 substantially the form of a skeleton truncated pyramid or cone.

It will be obvious that the inward movement of the sleeve or cuff 19 will force the inner ends of the arms 13 and feet 14 thereof inwardly and bring the spoke engaging portions 17 thereof into interlocking engagement with the spokes firmly securing the drum in position upon the wheels for rotation therewith. When the cuff is in the innermost, or adjacent the innermost position, the stop pins 22 extend intermediate the arms 12 and engage thereagainst to effectually prevent rotation of the cuff.

It will be obvious that my device may be utilized in a number of manners including those previously enumerated and that it may be attached and detached with a minimum expenditure of labor. It will likewise be obvious that my construction is susceptible to some changes without departing from the spirit of the invention and I accordingly do not limit myself to the specific construction described except as limited by the subjoined claims.

Having now described my invention, what I claim is:

1. In a detachable cable drum for spoked wheels, a yoke embodying radial arms provided with resilient angularly disposed diverging portions, the ends of said diverging portions being provided with radially disposed feet each provided with a portion adapted to engage intermediate two of the spokes of the wheel and interlock therewith, a cuff adapted when shifted longitudinally of said angular portions to contract the same to cause said spoke engaging portions to wedge intermediate the spokes, and means connecting said yoke and said cuff for causing said member to shift longitudinally of said yoke.

2. In a detachable cable drum for spoked wheels, a yoke embodying radial arms provided with resilient angularly disposed diverging portions, the ends of said diverging portions being provided with radially disposed feet each provided with a longitudinally adjustable portion adapted to engage intermediate the spokes of the wheel and interlock therewith, a cuff adapted when shifted longitudinally of said angular portions to contract the same to cause said spoke engaging portions to wedge intermediate the spokes, and means connecting said yoke and said cuff for causing said member to shift longitudinally of said yoke.

3. In a detachable cable drum for spoked wheels, a yoke embodying radial arms each having angularly disposed diverging extensions provided with radially extending feet, spoke chucking portions carried by said feet and provided in their sides with grooves adapted to receive the spokes of the wheel, a sleeve receiving said yoke and provided at its outer end with a transverse portion provided with an opening, an opening formed in each of the arms of said yoke and alining with the opening of said sleeve, a headed member provided with external screw threads having the headed end thereof interiorly disposed of said arms and extending through the openings of said arms and sleeve, said arms being independently shiftable about said headed member, and a lever nut mounted upon the upper end of said threaded member and engaging the threads thereof.

4. In a detachable cable drum for spoked wheels, a yoke embodying radial arms each having angularly disposed diverging extensions provided with radially extending feet, spoke chucking portions adjustably carried by said feet and each provided in each side thereof with a groove adapted to receive one of the spokes of the wheel, a sleeve receiving said yoke and provided at its outer end with a transverse portion provided with an opening, each of said arms having an opening formed therein and alining with the opening of said sleeve, a headed member provided with external screw threads having the headed end thereof interiorly disposed of said yoke and extending through the openings of said yoke and sleeve, a lever nut mounted upon the upper end of said threaded member and engaging the threads thereof, and means carried by said transverse portion and adapted to extend intermediate said radial arms for preventing rotation of said yoke.

In testimony whereof I hereunto affix my signature.

MONROE W. WILSON.